(12) United States Patent
Kim et al.

(10) Patent No.: US 12,062,846 B2
(45) Date of Patent: Aug. 13, 2024

(54) ANTENNA STRUCTURE AND IMAGE DISPLAY DEVICE INCLUDING THE SAME

(71) Applicant: DONGWOO FINE-CHEM CO., LTD., Jeollabuk-do (KR)

(72) Inventors: Jong Min Kim, Gyeonggi-do (KR); Chang Jun Maeng, Gyeonggi-do (KR); Yoon Ho Huh, Seoul (KR)

(73) Assignee: DONGWOO FINE-CHEM CO., LTD., Jeollabuk-Do (KR)

( * ) Notice: Subject to any disclaimer, the term of this patent is extended or adjusted under 35 U.S.C. 154(b) by 344 days.

(21) Appl. No.: 17/724,664

(22) Filed: Apr. 20, 2022

(65) Prior Publication Data

US 2022/0247069 A1  Aug. 4, 2022

Related U.S. Application Data

(63) Continuation of application No. PCT/KR2020/014756, filed on Oct. 28, 2020.

(30) Foreign Application Priority Data

Oct. 29, 2019 (KR) .......................... 10-2019-0135155

(51) Int. Cl.
*H01Q 1/52* (2006.01)
*H01Q 1/24* (2006.01)
*H04M 1/02* (2006.01)

(52) U.S. Cl.
CPC .............. *H01Q 1/52* (2013.01); *H01Q 1/243* (2013.01); *H04M 1/0266* (2013.01); *H04M 2201/38* (2013.01)

(58) Field of Classification Search
CPC ...... H01Q 1/52; H01Q 1/243; H04M 2201/38; H04M 1/0266
See application file for complete search history.

(56) References Cited

U.S. PATENT DOCUMENTS 8,564,314 B2 * 10/2013 Shaikh .................. G06F 3/0445
   324/687
8,577,289 B2 * 11/2013 Schlub ................... G01B 7/023
   343/702

(Continued)

FOREIGN PATENT DOCUMENTS

JP          2017-175540 A    9/2017
KR    10-2013-0095451 A    8/2013

(Continued)

OTHER PUBLICATIONS

International Search Report for PCT /KR2020/014756 mailed on Jan. 26, 2021.

(Continued)

*Primary Examiner* — Hai V Nguyen
(74) *Attorney, Agent, or Firm* — The PL Law Group, PLLC

(57) ABSTRACT

An antenna structure according to an embodiment of the present invention includes a substrate layer including a touch sensing region and a touch sensing-antenna region, sensing electrodes disposed on the substrate layer, the sensing electrodes being distributed throughout the touch sensing region and the touch sensing-antenna region, and an antenna unit disposed on the touch sensing-antenna region of the substrate layer, the antenna unit including a radiator that is interposed between the sensing electrodes or disposed in a sensing electrode of the sensing electrodes in a planar view.

16 Claims, 7 Drawing Sheets

(56) References Cited

U.S. PATENT DOCUMENTS

| | | | | |
|---|---|---|---|---|
| 10,658,753 B2* | 5/2020 | Tseng | | H01Q 9/42 |
| 10,734,708 B2* | 8/2020 | Yong | | H01Q 9/0407 |
| 11,340,722 B2* | 5/2022 | Oh | | G06F 3/0446 |
| 11,747,935 B2* | 9/2023 | Kim | | G06F 1/1658 |
| | | | | 345/174 |
| 11,782,564 B2* | 10/2023 | Kim | | G06F 3/04164 |
| | | | | 345/173 |
| 11,793,052 B2* | 10/2023 | Sung | | H10K 59/131 |
| | | | | 345/173 |
| 11,837,008 B2* | 12/2023 | Kim | | G06V 40/1306 |
| 11,967,754 B2* | 4/2024 | Kim | | H01Q 1/44 |
| 2012/0105081 A1* | 5/2012 | Shaikh | | G06F 3/0445 |
| | | | | 29/829 |
| 2012/0214412 A1* | 8/2012 | Schlub | | H03K 17/955 |
| | | | | 455/41.1 |
| 2017/0371452 A1* | 12/2017 | Endo | | H01Q 1/526 |
| 2019/0044232 A1* | 2/2019 | Tseng | | H01Q 1/245 |
| 2019/0165486 A1* | 5/2019 | Yoshida | | H04B 7/0617 |
| 2020/0021008 A1* | 1/2020 | Yong | | H01Q 21/005 |
| 2020/0067176 A1* | 2/2020 | Kim | | H01Q 1/38 |
| 2021/0382573 A1* | 12/2021 | Huh | | H01Q 9/0407 |
| 2022/0027013 A1* | 1/2022 | Kim | | G06F 1/1698 |

FOREIGN PATENT DOCUMENTS

| | | | | |
|---|---|---|---|---|
| KR | 10-2019-0090226 A | | 8/2019 | |
| KR | 10-2019-0095215 A | | 8/2019 | |
| KR | 10-2019-0105812 A | | 9/2019 | |
| WO | WO 2013/063176 A1 | | 5/2013 | |
| WO | WO-2015149852 A1 * | | 10/2015 | H01Q 1/243 |

OTHER PUBLICATIONS

Office action issued on Aug. 26, 2020 from Korean Patent Office in a counterpart Korean Patent Application No. 10-2019-0135155 (all the cited references are listed in this IDS.) (English translation is also submitted herewith.).

* cited by examiner

ANTENNA STRUCTURE AND IMAGE DISPLAY DEVICE INCLUDING THE SAME

CROSS-REFERENCE TO RELATED APPLICATION AND CLAIM OF PRIORITY

The present application is a continuation application to International Application No. PCT/KR2020/014756 with an International Filing Date of Oct. 28, 2020, which claims the benefit of Korean Patent Applications No. 10-2019-0135155 filed on Oct. 29, 2019 at the Korean Intellectual Property Office, the disclosures of which are incorporated by reference herein in their entirety.

BACKGROUND

1. Technical Field

The present invention relates to an antenna structure and an image display device including the same. More particularly, the present invention relates to an antenna structure combined with a touch sensor structure and an image display device including the same.

2. Background Art

Recently, electronic devices capable of inputting a user's direction by selecting an instruction displayed on an image display device with a human hand or an object by combining a touch sensor with the image display device have been developed in various forms such as a tablet PC.

Additionally, the image display device is being combined with a communication device such as a smart phone. Accordingly, an antenna for implementing a high-frequency or ultra-high frequency band communication may be applied to the image display device.

As described above, when the touch sensor and the antenna are included in one image display device, a design construction to insert a plurality of electrodes in a limited space is required. Further, an optical interference with a display panel of the image display device and an image generated therefrom may be caused by the electrodes. Additionally, currents or signals through a sensing electrode of the touch sensor and the antenna may be collide or interfere with each other.

For example, as disclosed in Korean Patent Published Application No. 2014-0092366, touch screen panels in which a touch sensor is coupled to various image display devices has been recently developed. Korean Patent Published Application No. 2013-0095451 discloses an antenna integrated into a display panel. However, an image display device in which an antenna and a touch sensor are efficiently arranged together is not provided.

SUMMARY

According to an aspect of the present invention, there is provided an antenna structure having improved electrical and optical properties and spatial efficiency.

According to an aspect of the present invention, there is provided an image display device including an antenna structure with improved electrical and optical properties and spatial efficiency.

(1) An antenna structure, including: a substrate layer including a touch sensing region and a touch sensing-antenna region; sensing electrodes disposed on the substrate layer, the sensing electrodes being distributed throughout the touch sensing region and the touch sensing-antenna region; and an antenna unit disposed on the touch sensing-antenna region of the substrate layer, the antenna unit including a radiator that is interposed between the sensing electrodes or disposed in a sensing electrode of the sensing electrodes in a planar view.

(2) The antenna structure according to the above (1), wherein the radiator has an area smaller than that of the sensing electrode.

(3) The antenna structure according to the above (2), wherein the sensing electrode including the radiator therein has a different shape from that of the sensing electrodes in the touch sensing region.

(4) The antenna structure according to the above (2), wherein the sensing electrode around the radiator has a smaller area than that of the sensing electrodes in the touch sensing region.

(5) The antenna structure according to the above (1), further including a dummy pattern interposed between the radiator and the sensing electrode.

(6) The antenna structure according to the above (5), wherein each of the sensing electrodes, the radiator and the dummy pattern includes a mesh structure.

(7) The antenna structure according to the above (1), wherein the antenna unit further includes a transmission line branching and extending from the radiator and a signal pad electrically connected to a terminal end of the transmission line.

(8) The antenna structure according to the above (7), wherein the transmission line is disposed in the sensing electrode together with the radiator.

(9) The antenna structure according to the above (7), wherein the transmission line is interposed between a pair of sensing electrodes neighboring each other of the sensing electrodes together with the radiator.

(10) The antenna structure according to the above (1), wherein the sensing electrodes includes first sensing electrodes arranged along a first direction that is parallel to a top surface of the substrate layer; and second sensing electrodes arranged along a second direction that is parallel to the top surface of the substrate layer and crosses the first direction.

(11) The antenna structure according to the above (10), further including bridge electrodes electrically connecting neighboring first sensing electrodes of the first sensing electrodes.

(12) The antenna structure according to the above (11), wherein the bridge electrode extends over a central line of the radiator.

(13) The antenna structure according to the above (11), wherein the bridge electrode do not overlap the radiator, and a current flow through the first sensing electrodes and the bridge electrode bypasses the radiator.

(14) The antenna structure according to the above (1), wherein the touch sensing region includes a central portion of the substrate layer, and the touch sensing-antenna region is located at one end portion of the substrate layer.

(15) The antenna structure according to claim 14, further including: an antenna driving integrated circuit chip electrically connected to the antenna unit on the touch sensing-antenna region; and a touch sensor driving integrated circuit chip electrically connected to the sensing electrodes on the other end portion of the substrate layer.

(16) An image display device including the antenna structure according to embodiments as described above.

The antenna structure according to embodiments of the present invention may include sensing electrodes and a radiator of an antenna unit at the same area or at the same level. Accordingly, additional separate space and process for forming the antenna unit may be omitted, and the antenna unit substantially integrated with a touch sensor layer may be provided.

In some embodiments, the antenna unit may be disposed between the sensing electrodes or included in the sensing electrode. Thus, an antenna radiation may be implemented while maintaining a touch sensing function even in the area where the antenna unit is employed.

In some embodiments, the sensing electrode and the antenna unit may include a mesh structure having, e.g., the same structure, and a visibility of the electrode to the user may be reduced by enhancing a pattern uniformity.

DETAILED DESCRIPTION OF THE EMBODIMENTS

According to exemplary embodiments of the present invention, there is provided an antenna structure including sensing electrodes and an antenna unit in the same region. The antenna structure may be a touch sensor-antenna structure combined or integrated with a touch sensor.

Further, an image display device including the antenna structure is also provided.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

Figure 1:
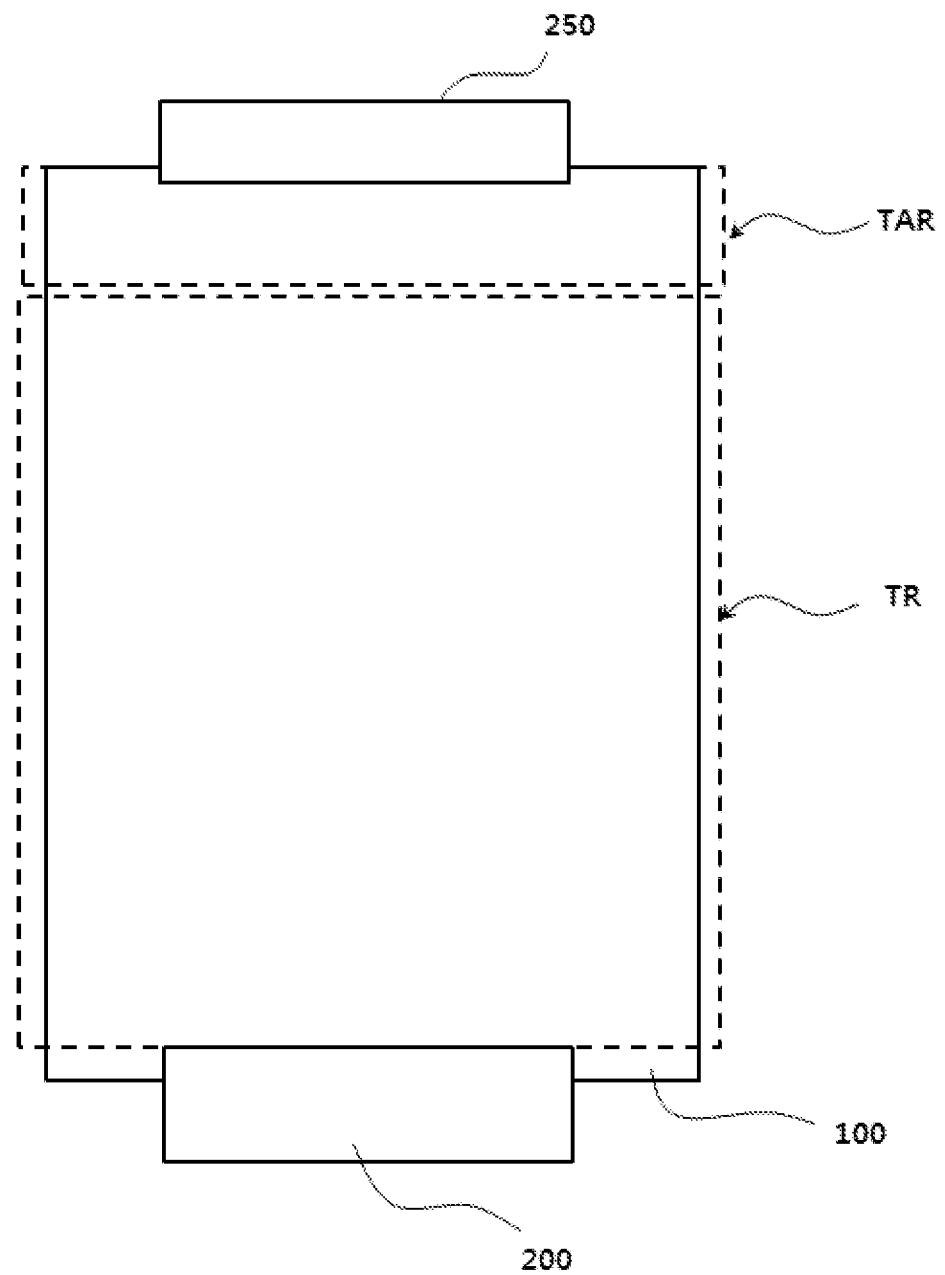
FIG. 1 is a schematic top planar view illustrating areas and structures of an antenna structure in accordance with exemplary embodiments.

FIG. 1 is a schematic top planar view illustrating areas and structures of an antenna structure in accordance with exemplary embodiments. For convenience of descriptions, illustration of sensing electrodes and antenna units are omitted in FIG. 1, and will be described later in more detail with reference to FIGS. 2 to 6.

Referring to FIG. 1, the antenna structure may include a substrate layer 100 on which sensing electrodes and antenna units are arranged.

The substrate layer 100 or the antenna structure may include a touch sensing region TR and a touch sensing-antenna region TAR.

The touch sensing region TR may include a central portion of the substrate layer 100 and may serve as a substantially active area of a touch sensor on which a user's touch input may be sensed.

The touch sensing-antenna region TAR may be, e.g., a region at which an antenna unit for implementing a high frequency or ultra-high frequency communication corresponding 3G, 4G, 5G or more communications is formed. In exemplary embodiments, some sensing electrodes of the touch sensor may be distributed together with the antenna unit in the touch sensing-antenna region TAR.

As illustrated in FIG. 1, the touch sensing-antenna region TAR may be allocated to one end portion of the substrate layer 100 to be adjacent to the touch sensing region TR.

The antenna structure may further include an integrated circuit (IC) chip for driving and controlling the touch sensor and the antenna unit. For example, an antenna driving IC chip 250 may be disposed adjacent to the touch sensing-antenna region TAR and electrically connected to the antenna unit. The touch sensor driving IC chip 200 may be disposed adjacent to the touch sensing area TR at the other end portion of the substrate layer 100 to be electrically connected to terminal ends of traces branching from the sensing electrodes.

In some embodiments, a flexible printed circuit boards (FPCB) may each be disposed between the antenna driving IC chip 250 and the antenna unit, and between the touch sensor driving IC chip 200 and the terminal ends of the traces.

Figure 2:
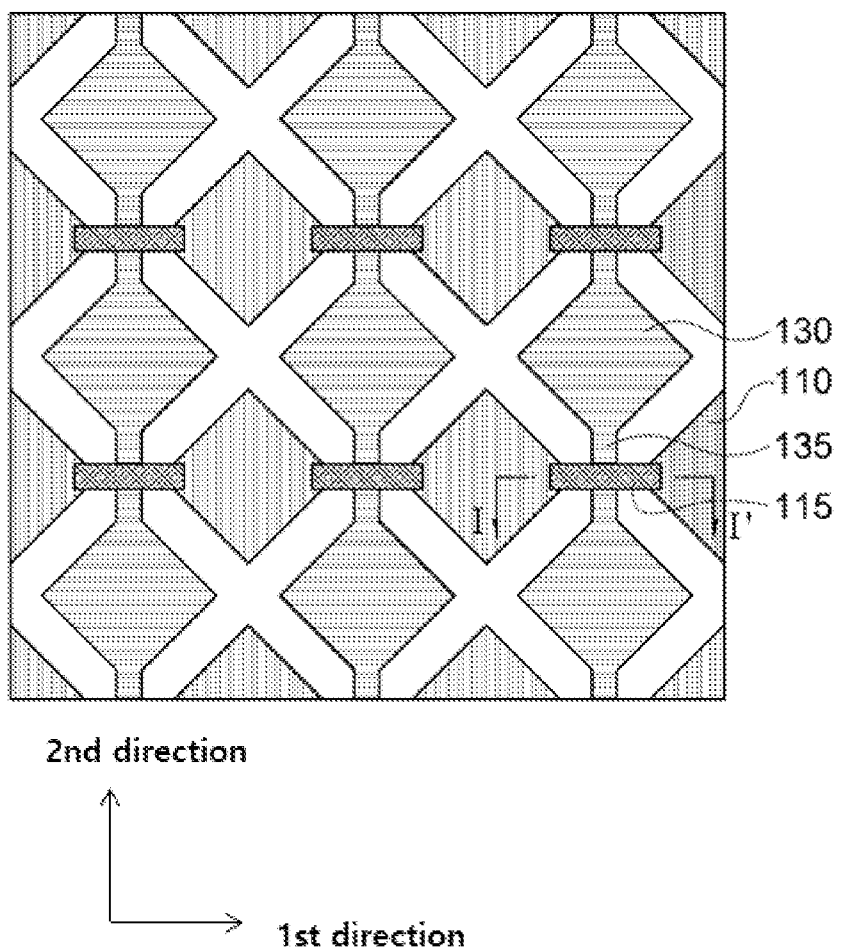
FIGS. 2 and 3 are a schematic top planar view and a schematic cross-sectional view, respectively, illustrating an arrangement of sensing electrodes of an antenna structure in accordance with exemplary embodiments.
Figure 3:
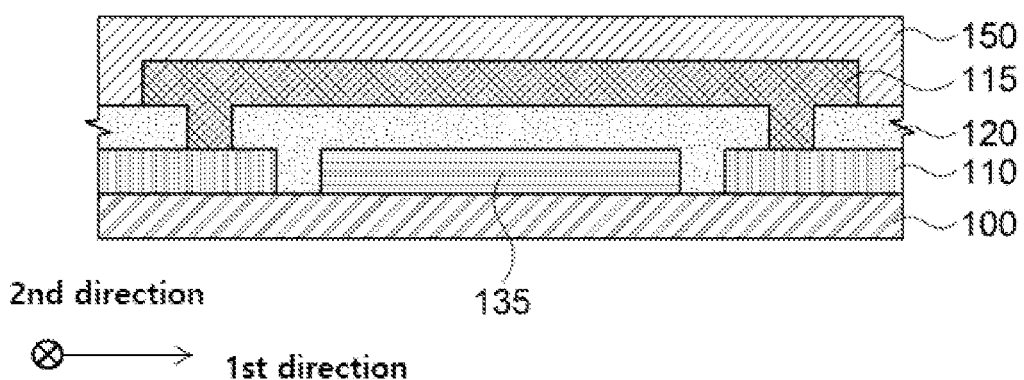

FIGS. 2 and 3 are a schematic top planar view and a schematic cross-sectional view, respectively, illustrating an arrangement of sensing electrodes of an antenna structure in accordance with exemplary embodiments. FIG. 3 is a cross-sectional view taken along a line I-I' of FIG. 2 in a thickness direction.

For example, FIGS. 2 and 3 illustrates arrangements and constructions of sensing electrodes on the touch sensing region TR.

In the accompanying drawings, two directions parallel to a top surface of the substrate layer 100 to cross each other are defined as a first direction and a second direction. For example, the first direction and the second direction may be perpendicular to each other.

Referring to FIGS. 2 and 3, the antenna structure may include the sensing electrodes 110 and 130, a bridge electrode 115 and a connection portion 135 arranged on the substrate layer 100.

The substrate layer 100 may broadly include a supporting layer or a film type member for forming the sensing electrodes 110 and 130 and the antenna unit to be described later. For example, the substrate layer 100 may include a film material commonly used for a touch sensor, and may include, for e.g., glass, a polymer and/or an inorganic insulating material. Examples of the polymer may include cyclic olefin polymer (COP), polyethylene terephthalate (PET), polyacrylate (PAR), polyetherimide (PEI), polyethylene naphthalate (PEN), polyphenylene sulfide (PPS), polyallylate, polyimide (PI), cellulose acetate propionate (CAP), polyethersulfone (PES), cellulose triacetate (TAC), polycarbonate (PC), cyclic olefin copolymer (COC), polymethyl methacrylate (PMMA), etc. Examples of the inorganic insulating material may include silicon oxide, silicon nitride, silicon oxynitride, a metal oxide, etc.

In some embodiments, a layer or film member of the image display device into which the antenna structure is inserted may serve as the substrate layer 100. For example, an encapsulation layer or a passivation layer included in a display panel may serve as the substrate layer 100.

The sensing electrodes 110 and 130 may include first sensing electrodes 110 and second sensing electrodes 130. For example, the sensing electrodes may be arranged to implement a mutual capacitance-type operation.

The first sensing electrodes 110 may be arranged along the first direction. Each of the first sensing electrodes 110 may have an independent island pattern shape, and the first sensing electrodes 110 neighboring in the first direction may be electrically connected to each other by the bridge electrode 115.

Accordingly, a first sensing electrode row extending in the first direction may be defined, and a plurality of the first sensing electrode rows may be arranged along the second direction.

The second sensing electrodes 130 may be arranged along the second direction. The second sensing electrodes 130 adjacent to each other in the second direction may be connected to each other by the connection portion 135. The second sensing electrodes 130 and the connection portion 135 may be integrally connected to each other to serve as a substantially single member. In this case, the second sensing electrodes 130 and the connection portion 135 may be patterned together from the same conductive layer, and may be positioned at the same layer or at the same level.

Accordingly, a second sensing electrode column extending in the second direction may be defined, and a plurality of the second sensing electrode columns may be arranged along the first direction.

Traces may branch and extend from each of the first sensing electrode rows and the second sensing electrode columns. Terminal ends of the traces may be collected at one end portion of the touch sensing region TR. The terminal ends of the traces may be electrically connected to the touch sensor driving IC chip 200 as illustrated in FIG. 1.

As illustrated in FIG. 3, an insulating layer 120 may be formed on the substrate layer 100 to at least partially cover the first sensing electrodes 110 and the connection portion 135. The bridge electrode 115 may be disposed on the insulating layer 120 to electrically connect the neighboring first sensing electrodes 110 to each other through, e.g., a contact hole formed in the insulating layer 120.

A passivation layer 150 for protecting the touch sensor may be formed on the insulating layer 120 and the bridge electrode 115.

The sensing electrodes 110 and 130 and/or the bridge electrode 115 may include silver (Ag), gold (Au), copper (Cu), aluminum (Al), platinum (Pt), Palladium (Pd), chromium (Cr), titanium (Ti), tungsten (W), niobium (Nb), tantalum (Ta), vanadium (V), iron (Fe), manganese (Mn), cobalt (Co), nickel (Ni), zinc (Zn), molybdenum (Mo), calcium (Ca) or an alloy containing at least one of the metals (e.g., silver-palladium-copper (APC) or copper-calcium (CuCa)). These may be used alone or in combination of two or more thereof.

The sensing electrodes 110 and 130 and/or the bridge electrode 115 may include a transparent conductive oxide such as indium tin oxide (ITO), indium zinc oxide (IZO), zinc oxide (ZnOx), indium zinc tin oxide (IZTO), cadmium tin oxide (CTO), or the like.

In some embodiments, the sensing electrodes 110 and 130 and/or the bridge electrode 115 may include a stacked structure of a transparent conductive oxide layer and a metal layer. For example, the sensing electrodes 110 and 130 and/or the bridge electrode 115 may have a double-layered structure of a transparent conductive oxide layer-metal layer or a triple-layered structure of a transparent conductive oxide layer-metal layer-transparent conductive oxide layer. In this case, a flexible property and a signal transmission speed may be improved by the metal layer, while a corrosion resistance and a transparency may be improved by the transparent conductive oxide layer.

Figure 4:
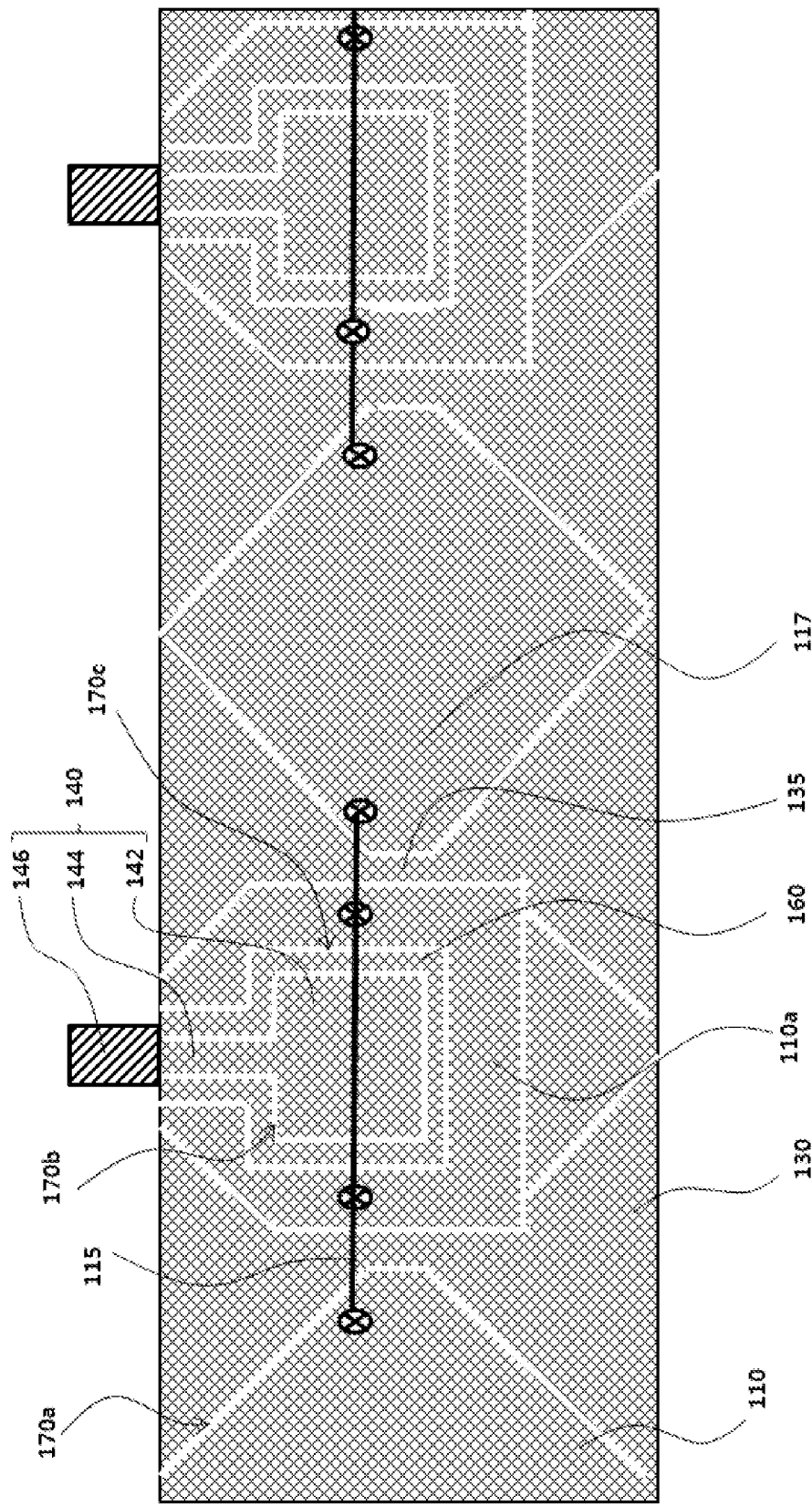
FIG. 4 is a schematic top planar view illustrating arrangements of sensing electrodes and antenna units of an antenna structure in accordance with exemplary embodiments.

In exemplary embodiments, as illustrated in FIG. 4, the sensing electrodes 110 and 130 may include a mesh structure including a plurality of electrode lines intersecting each other therein.

The insulating layer 120 and the passivation layer 150 may include an inorganic insulating material such as silicon oxide, silicon nitride, etc., or an organic insulating material such as an acrylic resin, a siloxane resin, etc.

FIG. 4 is a schematic top planar view illustrating arrangements of sensing electrodes and antenna units of an antenna structure in accordance with exemplary embodiments. For example, FIG. 4 is a partially enlarged top planar view of the touch sensing-antenna region TAR of FIG. 1.

Referring to FIG. 4, an antenna unit 140 may include a radiator 142, a transmission line 144 and a signal pad 146. The radiator 142 may have, e.g., a polygonal plate shape, and the transmission line 144 may branch and extend from the radiator 142. The signal pad 146 may be electrically connected to an end portion of the transmission line 144.

The antenna unit 140 may include a conductive material substantially the same as or similar to that of the sensing electrodes 110 and 130. For example, the antenna unit 140 may include the above-described metal or alloy, or a transparent conductive oxide, and may have a multi-layered structure of a metal layer and a transparent conductive oxide layer.

In some embodiments, the radiator 142 and the transmission line 144 may have a mesh structure including a plurality of electrode lines intersecting each other therein. In an embodiment, the radiator 142 and the transmission line 144 may be formed as a substantially single member including the mesh structure.

The signal pad 146 may be formed as, e.g., a solid pattern including the above-described metal or alloy to reduce a feeding resistance. The antenna driving IC chip 250 as illustrated in FIG. 1 may be electrically connected to the signal pad 146 of the antenna unit 140 via, e.g., an FPCB.

In an embodiment, at least a portion of the transmission line 144 may be formed as a solid pattern.

In exemplary embodiments, the radiator 142 of the antenna unit 140 may be formed at the same layer or at the same level as that of the sensing electrodes 110 and 130. In some embodiments, the radiator 142 may be included in any one of the sensing electrodes 110 and 130.

For example, as illustrated in FIG. 1, the radiator 142 may be included in one first sensing electrode 110. Hereinafter, the sensing electrode in which the radiator 142 is included is referred to as a common electrode 110a.

The common electrode 110a may have a different shape from the first sensing electrode 110 around the common electrode 110a. For example, the shape of the common electrode 110a may be changed from the first sensing electrode 110 to obtain a sufficient area in which the radiator 142 is accommodated.

In some embodiments, as illustrated in FIG. 4, second sensing electrodes 130 of the second sensing electrodes 130 adjacent to the common electrode 110a may have a different shape from that of other second sensing electrodes 130 (e.g., the second sensing electrodes 130 included in the touch sensing region).

In an embodiment, the transmission line 144 may also be included in the common electrode 110a.

A dummy pattern 160 may be further included in the common electrode 110a. The dummy pattern 160 may be disposed between a touch sensing portion of the common electrode 110a and the radiator 142.

As illustrated in FIG. 4, the dummy pattern 160 may include a mesh structure, and thus pattern shapes and structures around the radiator 142 may become uniform to prevent an electrode visibility. In an embodiment, the dummy pattern 160 may include cut regions in which electrode lines of the mesh structure are cut. In this case, a mutual interference between the common electrode 110a and the radiator 142 may be suppressed or reduced by the dummy pattern 160.

In some embodiments, the dummy pattern 160 may extend along profiles of the radiator 142 and the transmission line 144, and may surround the radiator 142 and the transmission line 144.

As described above, the sensing electrodes 110 and 130, the radiator 142, the transmission line 144 and the dummy pattern 160 may all include a mesh structure. For example, after forming a conductive layer on the substrate layer 100, the conductive layer may be etched to form the mesh structure while forming a separation region by cutting the electrode lines included in the mesh structure so that a boundary between electrodes or patterns may be formed.

For example, the first sensing electrode 110 and the second sensing electrode 130 may be separated from each other by a first separation region 170a. The radiator 142 and the transmission line 144 may be separated and defined within the common electrode 110a by a second separation region 170b. The dummy pattern 160 may be defined between a third separation region 170c and the second separation region 170b.

As illustrated in FIG. 4, the bridge electrode 115 electrically connecting the neighboring first sensing electrodes 110 (including the common electrode 110a) may extend over a substantial central line of the radiator 142. When a signal reception is performed through the radiator 142, a region at which a current or a field becomes substantially zero may be formed in the central line of the radiator 142.

When the bridge electrode 115 extends above the central line, a current flow through the first sensing electrodes 110 may not substantially interfere or collide with the field through the radiator 142. Accordingly, even when the antenna unit 140 is included in the sensing electrodes 110 and 130 of the touch sensor, touch sensing resolution and sensitivity may be maintained.

The bridge electrode 115 may connect the first sensing electrodes 110 including the common electrode 110a along the first direction through contacts 117 formed through the insulating layer 120 illustrated in FIG. 3.

Figure 5:
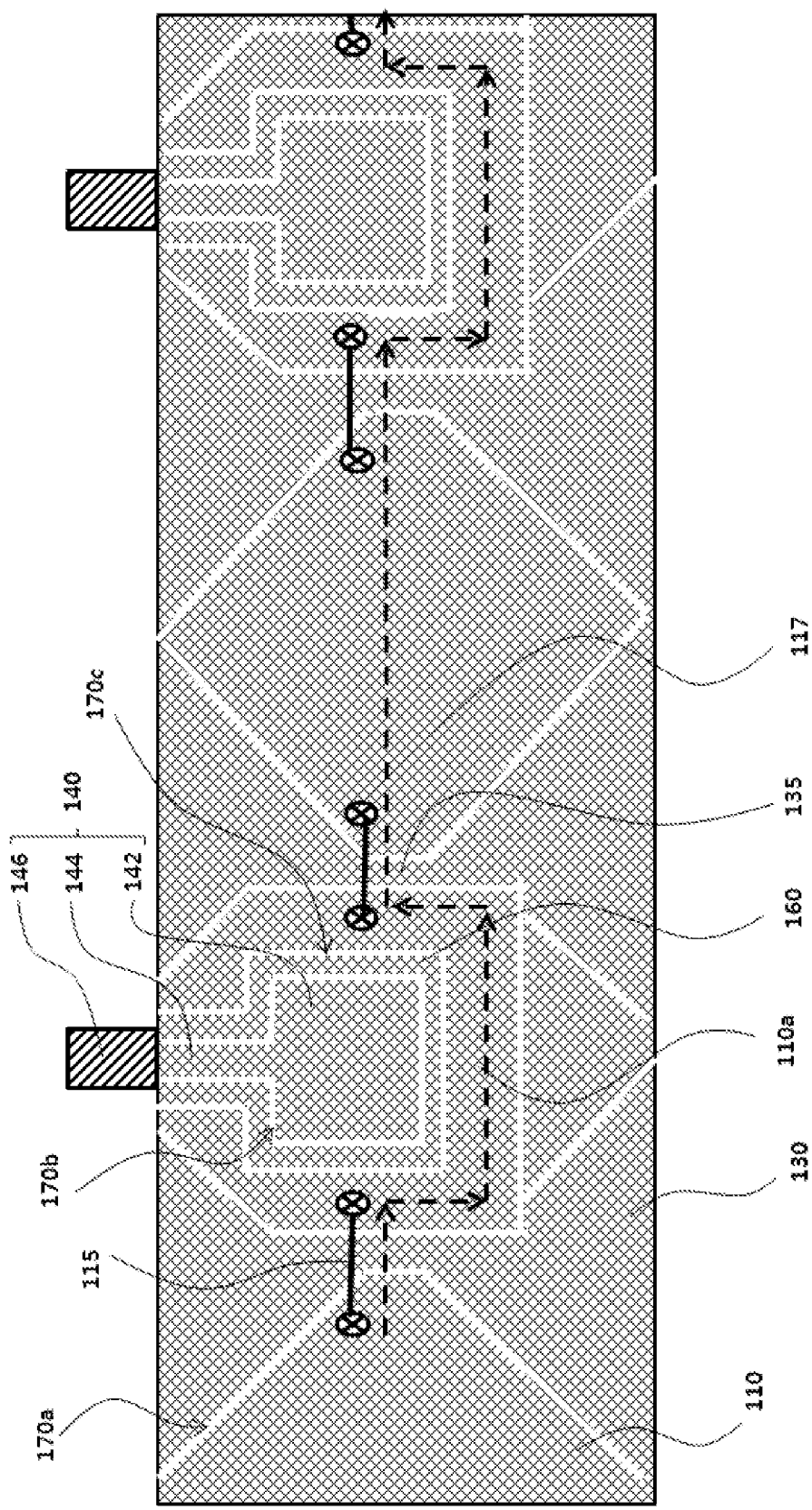
FIG. 5 is a schematic top planar view illustrating arrangements of sensing electrodes and antenna units of an antenna structure in accordance with exemplary embodiments.

FIG. 5 is a schematic top planar view illustrating arrangements of sensing electrodes and antenna units of an antenna structure in accordance with exemplary embodiments.

Referring to FIG. 5, electrodes may be arranged or designed so that a current flow through the sensing electrodes 110 and 130 may avoid or bypass the radiator 142.

For example, the bridge electrode 115 connecting the neighboring first sensing electrodes 110 may be disposed so as not to overlap the radiator 142 in the planar view. As illustrated in FIG. 5, the bridge electrode 115 may electrically connect the common electrode 110a and the first sensing electrode 110 adjacent to each other in the first direction, and may not extend above the radiator 142.

Accordingly, as indicated by dotted arrows in FIG. 5, a channel current through the first sensing electrodes 110 may proceed while avoiding the radiator 142. Accordingly, a mutual interference between the channel current of the touch sensor and the field from the radiator 142 may be suppressed or reduced.

In some embodiments, the antenna unit 140 including the radiator 142 and the transmission line 144 may be located at a different layer or at a different level from that of the sensing electrodes 110 and 130. In an embodiment, the antenna unit 140 may be disposed at the same layer as that of the bridge electrode 115.

In this case, the antenna unit 140 may be disposed as illustrated in FIG. 5 when observed or projected in the planar view. As described above, the radiator 142 may be disposed in the sensing electrodes 110 and 130, e.g., in the common electrode 110a.

In an embodiment, the sensing electrodes 110 and 130 may have a triple-layered structure of the above-described transparent conductive oxide layer-metal layer-transparent conductive oxide layer (e.g., a solid pattern), and the antenna unit 140 or the radiator 142 may include a mesh structure.

Figure 6:
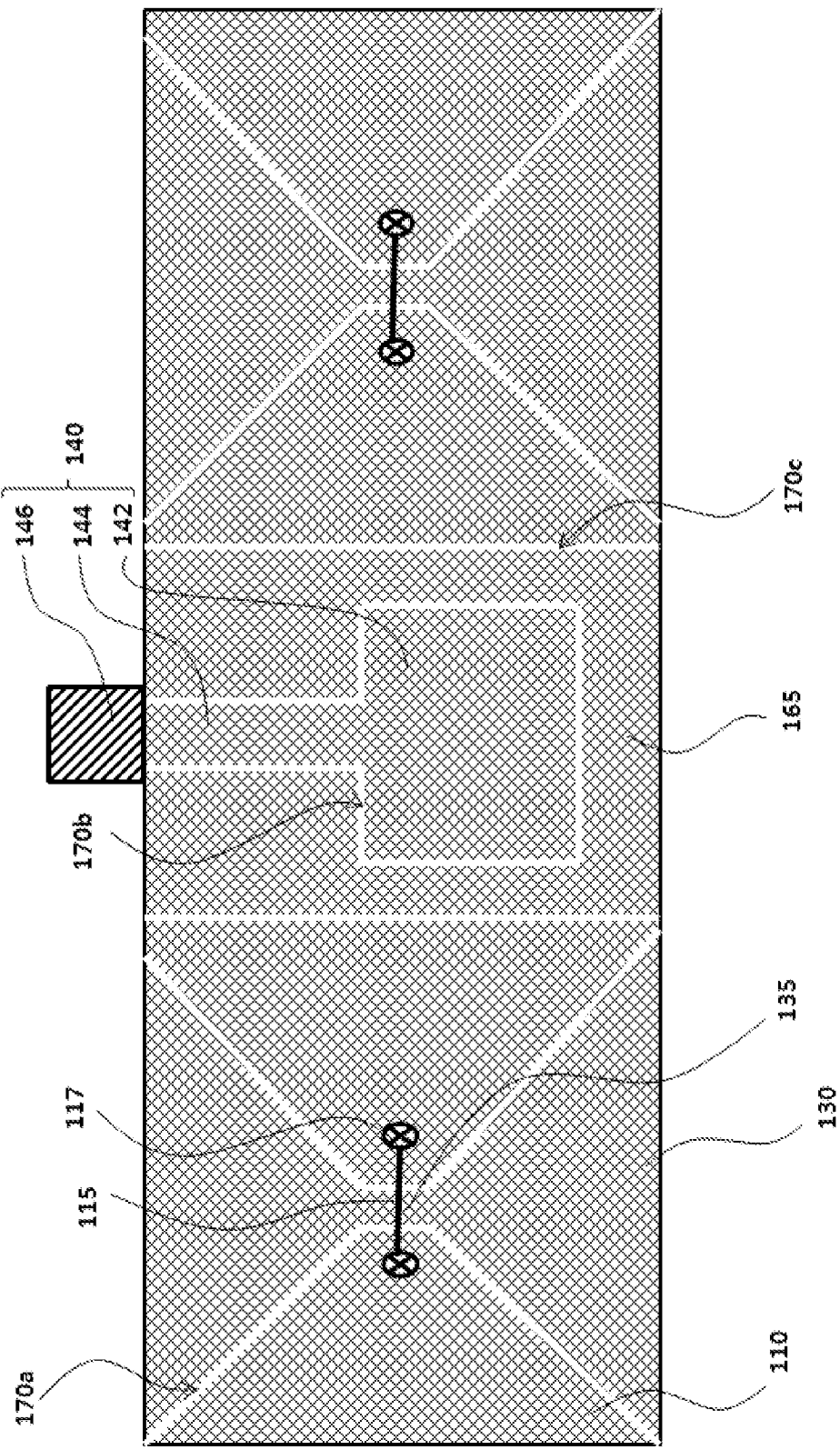
FIG. 6 is a schematic top planar view illustrating arrangements of sensing electrodes and antenna units of an antenna structure in accordance with exemplary embodiments.

FIG. 6 is a schematic top planar view illustrating arrangements of sensing electrodes and antenna units of an antenna structure in accordance with exemplary embodiments.

Referring to FIG. 6, the radiator 142 and the transmission line 144 may be disposed between neighboring sensing electrodes 110 and 130.

For example, the radiator 142 may be disposed between the first sensing electrodes 110 neighboring in the first direction. In some embodiments, a dummy pattern 165 may be disposed between the first sensing electrode 110 and the radiator 142.

The first sensing electrode 110 and the dummy pattern 165 may be insulated and separated from each other by a third separation region 170c, and the radiator 142 and the transmission line 144 of the antenna unit 140 may be insulated and separated from the dummy pattern 165 by a second separation region 170b.

In exemplary embodiments, the radiator 142 may have a smaller area than that of the sensing electrodes 110 and 130. Thus, even when the radiator 142 is inserted between the sensing electrodes 110 and 130, a touch sensing in the touch sensing-antenna area (TAR) may be promoted while reducing the area from which the touch sensing is deactivated.

In some embodiments, the sensing electrode (e.g., the first sensing electrode 110) around the radiator 142 may have a smaller area than that of the sensing electrode in the touch sensing area TR. For example, the sensing electrode around the radiator 142 may have a cut shape of the sensing electrode in the touch sensing area TR.

In this case, the radiator 142 may have a smaller area than that of the cut-shaped sensing electrode around the radiator 142.

In some embodiments, the antenna unit 140 including the radiator 142 and the transmission line 144 may be located at a different layer or at a different level from that of the sensing electrodes 110 and 130. In an embodiment, the antenna unit 140 may be disposed at the same layer as that of the bridge electrode 115.

In this case, the antenna unit 140 may be disposed as illustrated in FIG. 6 when viewed or projected in the planar view. As described above, the radiator 142 may be disposed between neighboring sensing electrodes 110 and 130.

In an embodiment, the sensing electrodes 110 and 130 have a triple-layered structure of the above-described transparent conductive oxide layer-metal layer-transparent conductive oxide layer (e.g., a solid pattern), and an antenna unit 140 or the radiator 142 may include a mesh structure.

FIGS. 1 to 6 illustrate a touch sensor having a top-bridge structure in which the bridge electrode 115 is disposed on the sensing electrodes 110 and 130, but the touch sensor according to exemplary embodiments may also have a bottom-bridge structure in which the bridge electrode 115 is disposed under the sensing electrodes 110 and 130.

In this case, the bridge electrode 115 may be formed on the substrate layer 100, and then the insulating layer 120 may be formed on the bridge electrode 115. The sensing electrodes 110 and 130 may be formed on the insulating layer 120, and the neighboring first sensing electrodes 110 may be electrically connected to the bridge electrode 115 through a contact hole formed in the insulating layer 120.

Figure 7:
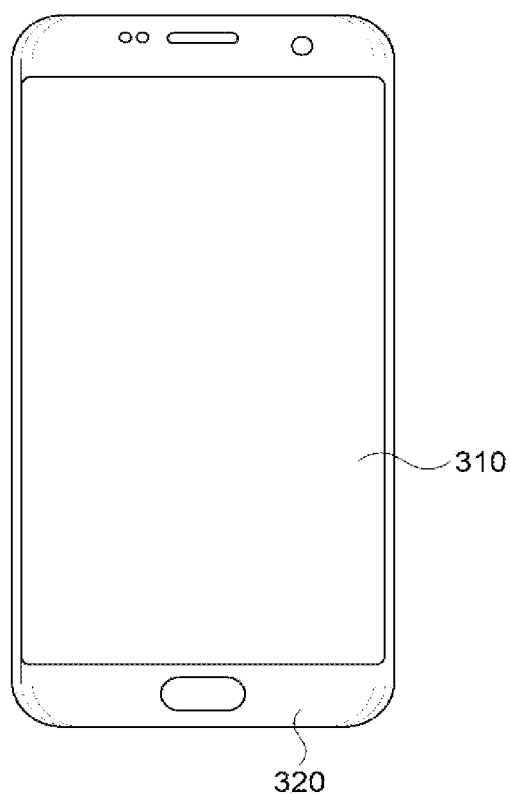
FIG. 7 is a schematic top planar view illustrating an image display device in accordance with exemplary embodiments.

FIG. 7 is a schematic top planar view illustrating an image display device in accordance with exemplary embodiments. For example, FIG. 7 illustrates an external shape including a window of an image display device.

Referring to FIG. 7, an image display device 300 may include a display area 310 and a peripheral area 320. For example, the peripheral area 320 may be disposed at both lateral portions and/or both end portions of the display area 310. The peripheral area 320 may correspond to, e.g., a light-shielding portion or a bezel portion of the image display device.

The above-described antenna structure may be disposed over the display area 310 and the peripheral area 320 of the image display device 300, and the first and second sensing electrodes 110 and 130 of the touch sensing region TR may be arranged in the display area 310.

The touch sensing-antenna region TAR may be located over the display area 310 and the peripheral area 320. For example, the radiator 142 of the antenna unit 140 and the sensing electrodes 110 and 130 around the radiator 210 may also be arranged in the display area 310. As described above, the radiators 142 may be formed using the mesh structure to be prevented from being visually recognized by the user.

The signal pad 146 of the antenna unit 140 illustrated in FIG. 4 may be disposed in the peripheral area 320.

Additionally, the touch sensor driving IC chip 200 and the antenna driving IC chip 250 may be disposed in the peripheral area 320 to be electrically connected to pads connected to the sensing electrodes 110, 130 and 160 and the signal pads 146 of the antenna unit 140, respectively.

According to the above-described exemplary embodiments, the antenna unit 140 of the antenna structure may be integrated with the sensing electrodes 110, 130 and 160 of the touch sensor at the same area or at the same region so that a degree of a spatial freedom of the image display device may be increased.

What is claimed is:

1. An antenna structure, comprising:
   a substrate layer including a touch sensing region and a touch sensing-antenna region;
   sensing electrodes disposed on the substrate layer, the sensing electrodes being distributed throughout the touch sensing region and the touch sensing-antenna region; and
   an antenna unit disposed on the touch sensing-antenna region of the substrate layer, the antenna unit including a radiator that is interposed between the sensing electrodes or disposed in a sensing electrode of the sensing electrodes in a planar view.

2. The antenna structure according to claim 1, wherein the radiator has an area smaller than that of the sensing electrode.

3. The antenna structure according to claim 2, wherein the sensing electrode including the radiator therein has a different shape from that of the sensing electrodes in the touch sensing region.

4. The antenna structure according to claim 2, wherein the sensing electrode around the radiator has a smaller area than that of the sensing electrodes in the touch sensing region.

5. The antenna structure according to claim 1, further comprising a dummy pattern interposed between the radiator and the sensing electrode.

6. The antenna structure according to claim 5, wherein each of the sensing electrodes, the radiator and the dummy pattern includes a mesh structure.

7. The antenna structure according to claim 1, wherein the antenna unit further comprises a transmission line branching and extending from the radiator and a signal pad electrically connected to a terminal end of the transmission line.

8. The antenna structure according to claim 7, wherein the transmission line is disposed in the sensing electrode together with the radiator.

9. The antenna structure according to claim 7, wherein the transmission line is interposed between a pair of sensing electrodes neighboring each other of the sensing electrodes together with the radiator.

10. The antenna structure according to claim 1, wherein the sensing electrodes comprises:
    first sensing electrodes arranged along a first direction that is parallel to a top surface of the substrate layer; and
    second sensing electrodes arranged along a second direction that is parallel to the top surface of the substrate layer and crosses the first direction.

11. The antenna structure according to claim 10, further comprising bridge electrodes electrically connecting neighboring first sensing electrodes of the first sensing electrodes.

12. The antenna structure according to claim 11, wherein the bridge electrode extends over a central line of the radiator.

13. The antenna structure according to claim 11, wherein the bridge electrode do not overlap the radiator, and a current flow through the first sensing electrodes and the bridge electrode bypasses the radiator.

14. The antenna structure according to claim 1, wherein the touch sensing region includes a central portion of the substrate layer, and the touch sensing-antenna region is located at one end portion of the substrate layer.

15. The antenna structure according to claim 14, further comprising:
    an antenna driving integrated circuit chip electrically connected to the antenna unit on the touch sensing-antenna region; and
    a touch sensor driving integrated circuit chip electrically connected to the sensing electrodes on the other end portion of the substrate layer.

16. An image display device comprising the antenna structure according to claim 1.

* * * * *